(No Model.)
J. F. WOLLENSAK.
TRANSOM LIFTER.
No. 381,741. Patented Apr. 24, 1888.
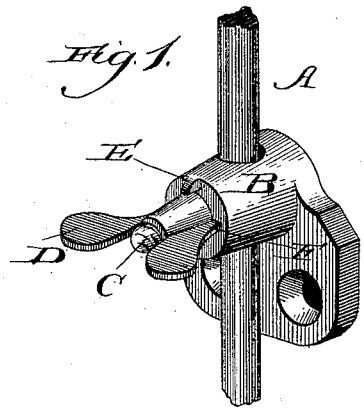
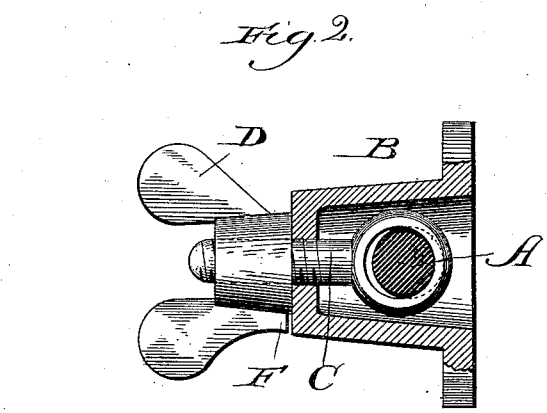
Witnesses:
Chas. E. Taylord.
George C. Cook.
Inventor:
John F. Wollensak
By Banning & Banning
Attys

UNITED STATES PATENT OFFICE.

JOHN F. WOLLENSAK, OF CHICAGO, ILLINOIS.

TRANSOM-LIFTER.

SPECIFICATION forming part of Letters Patent No. 381,741, dated April 24, 1888.

Application filed October 6, 1887. Serial No. 251,655. (No model.)

*To all whom it may concern:*

Be it known that I, JOHN F. WOLLENSAK, a citizen of the United States, residing at Chicago, Illinois, have invented certain new and useful Improvements in Fastenings for Transom-Lifters, of which the following is a specification.

The object of my invention is to make a fastener for retaining the lifting-rod of a transom at any desired point up or down, so as to hold the transom at any desired angle, and also to make a fastener of which the parts cannot easily become detached and lost; and my invention consists in the features and details of construction, hereinafter described and claimed.

In the drawings, Figure 1 is a perspective view of my improved fastener with a part of the lifting-rod of a transom in place, and Fig. 2 is a transverse longitudinal sectional view of the shell or case in which the fastening device is arranged.

A represents the lifting-rod of the transom; B, the shell or case through which it passes and in which the fastening device is arranged; C, the fastening device; D, a nut on the outer end of the fastening device; E, a projection on the shell or case, and F an extension on the nut.

In making my improved fastener for the lifting-rods of transoms I make a shell or case which is intended to be attached to the door-casing by screws or otherwise, and through which the lifting-rod passes and by which it is guided in its movements up and down. This case is hollow and is provided with holes in its sides through which the lifting-rod passes, as shown in the drawings. It is preferably provided with a flange or foot-piece with screw-holes to enable it to be readily and securely attached to the door-casing. Through the outer end of the shell another hole is provided, through which the outer end of the fastening device extends, as shown in the drawings. The "fastening device," as I term it, is preferably a short piece of metal with a ring or eye on the inner end, through which the lifting-rod of the transom passes, and with screw-threads on the outer end adapted to receive a nut, D, which may be screwed into place by the thumb and finger. These parts, when combined as hereinafter described, make a practical and economical fastener; but as the nut might be removed by children or servants, so that the parts would cease to be fully operative, I prefer to provide the shell with an outward projection, E, (shown in Fig. 1,) and the nut with an extension, F, at one side, as shown in Fig 2 of the drawings. The projection E on the shell or case and the extension F on the nut are adapted to come into contact with each other when the nut is run down a sufficient distance on the threaded end of the fastening device, and when the nut is fully down the projection E strikes against the extension F and prevents the nut from being more than partially unscrewed, so that it cannot be removed except as hereinafter described.

In operation the fastening device is inserted from the inside into the shell or case before it is fastened to the door-casing and with its threaded end extending out, and the nut is screwed into place and run down until the extension F has reached the projection E. Immediately after this extension passes the projection the last time it can, while the ring on the inner end of the fastening device is pushed out against the inside of the outer end of the shell or case, the fastening device, with the nut, should be pushed down until the nut rests against the outer end of the shell or case with the extension F just past the projection E, so that such projection will not prevent the nut from being turned still farther around in screwing it on. This should bring the eye or ring on the inner end of the fastening device in line with the holes in the shell or case through which the lifting-rod of the transom passes. The lifting-rod should now be inserted so as to pass through the holes in the shell or case and through the ring or eye on the inner end of the fastening device. By turning the nut a little farther, so that the extension F is carried, say, a quarter of a turn beyond the projection E, the fastening device will be drawn out far enough to bring the lifting-rod tightly into contact with the outer edges of the holes in the shell or case B, so that the same will be securely bound and held by the friction thus produced. If the nut be turned back to unscrew it, it will turn until the extension F strikes against the projection E, which will prevent its being further unscrewed and removed. This quarter of a turn back will be sufficient, however, to release the fastening device enough to loosen the lifting-rod and allow it to be raised or lowered. By turning the nut again in the other direction it will again be drawn against the outer edges of the holes in the shell or case and again bound and held at the desired position.

To enable the nut to be unscrewed and removed from the threaded end of the fastening device, it should be turned back until the extension F strikes against the projection E, which, as before said, will release the rod and enable it to be moved up or down. By removing the rod entirely from the shell or case the fastening device may be drawn out sufficiently to raise the extension F above the projection E and enable the nut to be entirely unscrewed. It will be seen that after the lifting-rod has been inserted through the holes of the shell or case and through the eye or ring on the inner end of the fastening device the nut D cannot be removed until the lifting-rod has been withdrawn, which will require the shell or case to be unscrewed from and taken off of the door-casing. In this way a secure connection is made for the fastening parts, so that they cannot, without considerable work and difficulty, be taken apart after they have been once inserted in their places on the door-casings, and liability of displacement or loss of the various parts is obviated.

I have thus far in describing the operation of the various parts described them principally in connection with a shell provided with a projection, E, and a nut provided with an extension, F. The parts are put together when these features are omitted in the same way that they are when they are employed, and the lifting-rod is held from moving up or down by friction against the outer edges of the holes in the sides of the shell or case, as above described; but when the projection on the shell and the extension on the nut are omitted the nut can be removed without taking the rod out of the holes in the shell or case and the ring or eye on the inner end of the fastening device, unless some means be employed to prevent its removal. It is obvious, therefore, that the use of these features to prevent removal and possible loss of the nut is a decided advantage, and I prefer to use them, though without them my fastener is still a practical one and possesses many advantages over any now in use so far as I know.

Whether the projection and the extension E and F be used or not, the lifting-rod of the transom will be drawn out from the door-casing, instead of being pressed in against it, as in the use of ordinary thumb-screws, so that there will be less liability of the wood of the casing being scratched or marred than in the use of ordinary thumb-screws.

I have described my improvements in connection with transom-lifting rods and shall in the claim treat of my improvement as a fastener for transom-lifting rods; but I do not mean to confine myself to transom-lifting rods in its use, and do not mean to limit myself by my specification and claim to transom-lifters only, as I shall use it in connection with any sort of a rod to which it is applicable, whether used for lifting transoms or other articles. I have also spoken of the fastening device having an eye or ring on the inner end. By this I mean anything that will catch the lifting-rod and draw it out, whether the eye or ring be a complete circle, as shown, or a partial circle, as a hook.

What I regard as new, and desire to secure by Letters Patent, is—

In a fastener for transom lifting rods, the combination of a shell or case having holes in its sides through which the lifting-rod may pass, a hole in its outer end through which the outer end of a fastening device may extend, and a projection, as E, on its outer end, a fastening device having a ring or eye on its inner end and screw-threads on its outer end inserted in the shell or case from the inside with its threaded end extending out through the hole in the outer end of the shell, a transom-lifting rod passing through the holes in the side of the shell or case and through the ring or eye on the inner end of the fastening device, and a nut having an extension, as F, on one side screwed onto the outer end of the fastening device and drawing the lifting-rod against the outer edges of the holes in the shell or case, the extension on the nut and the projection on the shell contacting against each other as the nut is unscrewed and preventing its removal when the parts are together, substantially as described.

JOHN F. WOLLENSAK.

Witnesses:
EPHRAIM BANNING,
THOMAS A. BANNING.